United States Patent [19]
Filas et al.

[11] Patent Number: 6,097,873
[45] Date of Patent: Aug. 1, 2000

[54] OPTICAL FIBER ATTENUATOR DEVICE USING AN ELASTOMERIC ATTENUATOR MEMBER

[75] Inventors: Robert William Filas, Bridgewater, N.J.; Wilton Wayt King, Chamblee, Ga.; William Roger Lambert, Chester, N.J.

[73] Assignee: Lucent Technologies Inc., Murray Hill, N.J.

[21] Appl. No.: 09/007,134

[22] Filed: Jan. 14, 1998

[51] Int. Cl.[7] ................................................ G02B 6/38
[52] U.S. Cl. .............................. 385/140; 385/73; 385/139
[58] Field of Search .................................... 385/139–141, 385/73

[56] References Cited

U.S. PATENT DOCUMENTS

| | | | |
|---|---|---|---|
| 4,512,630 | 4/1985 | Runge | 385/73 |
| 4,998,795 | 3/1991 | Bowen et al. | 385/78 |
| 5,082,345 | 1/1992 | Cammons et al. | 385/60 |
| 5,122,390 | 6/1992 | Rearick et al. | 427/117 |
| 5,134,676 | 7/1992 | Boillot et al. | 385/72 |
| 5,263,103 | 11/1993 | Kosinski | 385/31 |
| 5,778,127 | 7/1998 | Gilliland et al. | 385/92 |

*Primary Examiner*—John D. Lee
*Assistant Examiner*—Michael J. Stahl
*Attorney, Agent, or Firm*—Mathews, Collins, Shepherd & Gould, P.A.

[57] ABSTRACT

An improved optical fiber connection system comprises an attenuator element fabricated with an inherently elastomeric material, preferably a silicone elastomer. Silicone elastomers are particularly preferred for fabricating attenuator elements as they may be index-matched to optical transmission fibers, have a high creep modulus, exhibit relatively constant mechanical properties over a broad range of temperatures, and are reliable upon exposure to varied environmental conditions. Preferably, a disc-like attenuator element is punch-cut from a sheet of a silicone elastomer and inserted into the sleeve of an optical connector apparatus adjacent the end portion of an optical fiber to provide a simplified method of fabrication. Alternatively, the silicone attenuator element may be fabricated by liquid injection molding technology. The approximate reflectance of the inventive silicone attenuators at wavelengths of about 1310 nm measured at 23° C. is less than −50 dB.

20 Claims, 8 Drawing Sheets

OPTICAL FIBER ATTENUATOR DEVICE USING AN ELASTOMERIC ATTENUATOR MEMBER

FIELD OF THE INVENTION

The present invention relates to an improved optical communication device, and more particularly, to an optical fiber connector comprising an attenuator element fabricated from an elastomeric material, preferably silicone elastomer.

BACKGROUND OF THE INVENTION

Optical fibers are gaining widespread use in many applications and particularly for use in communications systems. Basically, an optical fiber comprises an inner core fabricated from a dielectric material having a certain index of refraction and a cladding surrounding the core. The cladding is comprised of a material having a lower index of refraction than the core. In most practical applications, the refractive indices of the core and cladding differ from each other by only a few percent. In any case, as long as the refractive index of the core exceeds that of the cladding, a light beam launched into the fiber and propagated along the core exhibits total internal reflection and is guided along the length of the core to transmit a signal. For typical transmission applications, a fiber optic core comprises 3% $GeO_2$/$SiO_2$ which at 25° C. exhibits a refractive index of about 1.451 at the wavelength 1300 nm and a refractive index of about 1.448 at the wavelength 1550 nm. The refractive index is temperature dependent.

Similar to electrical transmission paths, it is important that optical transmission paths be properly connected to other paths or a termination port. A widely used connector for this purpose comprises the ST® connector, ST® being a registered Trademark of AT&T Corp., now Lucent Technologies, Inc. The design of this connector is described in U.S. Pat. No. 4,934,785, issued Jun. 19, 1990, and in U.S. Pat. No. 5,619,610, issued Apr. 8, 1997, both of which are hereby incorporated by reference. The latter of these patents ('910), entitled "Optical Terminator," issued to King and Lambert, two of the inventors herein, was assigned to Lucent Technologies, Inc., the assignee herein, and will herein be referred to as the King patent.

A difficulty in connecting and terminating optical transmission paths involves back reflection, that is, a signal may be reflected from a point of discontinuity back toward its source. A point of discontinuity resulting in back reflection may occur for a number of reasons, such as a change in the refractive indices of interfacing materials, misalignment of the cores of optical fibers being connected, or perturbations along the transmission path. A back-reflected signal also may be further reflected at the source to be retransmitted along the transmission path. Back reflections present a serious problem in optical fiber systems as they introduce undesirable noise components into the signal, degrade performance of the system capacity, and can corrupt the transmission source, which typically is a laser.

Reflectance can be calculated as a function of the refractive index differential of interfacing materials, pursuant to the equation:

$$\text{Reflectance } (dB) = 10 \log [(n_o - n_i)^2 / (n_o + n_i)^2]$$

Thus, for a glass-to-air interface ($n_o \approx 1.0$ for air, $n_f \approx 1.46$ for glass), the reflectance is about 14.6 dB. For two materials with only slightly different indices of refraction (e.g., $n_f \approx 1.46$ vs. 1.47), the reflectance is calculated to be −49.3 dB. Optimally for high performance systems, reflectance generated by an optical connection should be less than −50 dB.

It is important to control back reflections associated with optical fiber connectors and terminators, and many approaches have been taken to this end. One approach involves interfacing the end portion of the optical fiber with a terminator or attenuator portion that is index matched to the core of the optical fiber, thereby avoiding a glass-to-air interface. U.S. Pat. No. 4,998,795 issued to Bowen et al. on Mar. 12, 1991, entitled "Reflection-Less Terminator," which is incorporated herein by reference, describes use of a carbon-black filled epoxy material in fabricating a termination portion which also is designed to absorb the radiation and dissipate the signal. It is difficult to precisely match, however, the index of refraction of the core with the material used in making the termination, and use of anti-reflective surface coatings may be necessary. But anti-reflective surface coatings present additional problems in that when exposed to aging environments, the coatings may crack, delaminate, and flake, thereby undermining the effectiveness of the coating and the reliability of the device.

Figure 2:
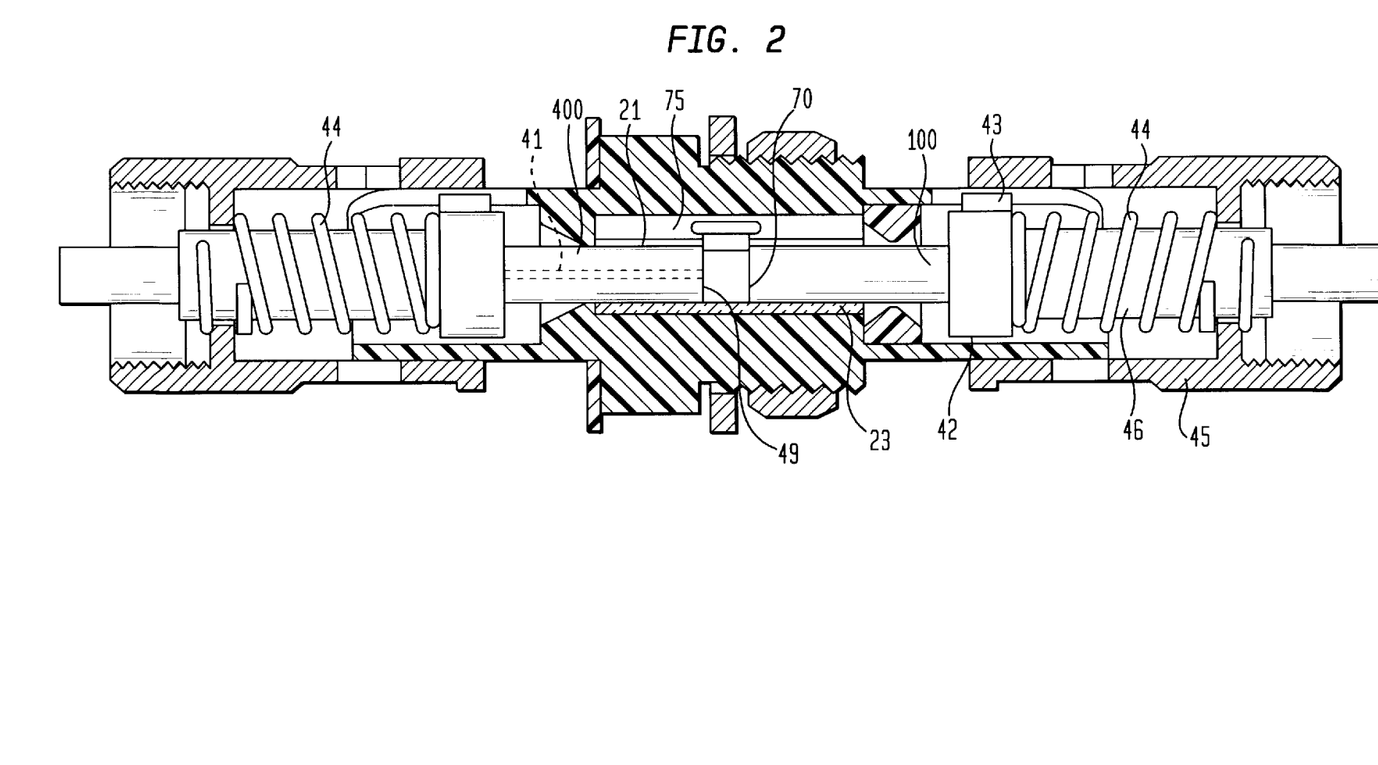
FIG. 2. is an exploded cross-sectional view of an optical fiber connection system having an attenuator element.

A low reflection attenuation device for use in an optical fiber connector is described in U.S. Pat. No. 5,082,345 issued to Cammons et al. on Jan. 21, 1992, entitled "Optical Fiber Connecting Device Including Attenuator" (the "Cammons patent") assigned to AT&T Bell Laboratories, a predecessor of Lucent Technologies, Inc. (the assignee herein), which is hereby incorporated by reference. The Cammons patent describes use of polymethylmethacrylate (PMMA) to fabricate a disc-shaped attenuator portion (FIG. 2, 70). However, PMMA has an index of refraction of 1.49, whereas a fiber optic core is typically fabricated with 3% $GeO_2$-doped silica having a refractive index of about 1.451 at 25° C. and 1300 nm. This refractive-index differential correlates to an attenuator portion producing −40 dB reflectance which is suitable for many applications but less than optimal for high performance optical fiber systems.

A low-reflection terminator fabricated from a polymeric material having an index of refraction of about 1.45±0.01 and enabling reflectance of less than −50 dB is described in the previously referenced King patent. Use of polymeric materials to fabricate the attenuators and terminators is advantageous because polymers are inexpensive (as compared with ceramics), and may be readily molded into desired configurations with use of injection molding. The attenuation level is determined by the thickness of the element (which typically is from 0.010 to 0.060 inches), and by the incorporation of absorbing particles (carbon black) or scattering particles; a small percentage of carbon black or scattering particles may be added to the polymer to contribute an absorptive component and thereby increase the attenuation level. However, there are a limited number of thermoplastic polymers that may be used in optical attenuators and terminators meeting all the desired criteria of having a refractive index of about 1.45±0.01 enabling reflection of −50 dB, allowing for injection molding, and also having a low creep modulus.

Low creep modulus is important in fabricating connector components of optical attenuators to ensure reliable long-term performance. Thermoplastic polymers will irreversibly creep when subjected to compressive forces and/or high temperatures such as those encountered in optical attenuators. In application, an optical attenuator will be pressed against an optical fiber for long periods of time, ultimately resulting in indentations on the surface of the connector element. These surface deformations will impact upon the performance of the device when different connections are made. The extent of the creep and, therefore, the extent or size of the surface deformations will depend on the applied force, the use temperature, and the glass transition and heat distortion temperature of the polymer used to fabricate the connector elements. The heat distortion temperature reflects the temperature at which significant distortions occur and is measured at 264 psi according to standards known in the field as ASTM D648. The higher the heat distortion temperature of the polymer, the more resistant the material will be to deformation. Advantageously, the heat distortion temperature should be greater than about 80° C. and even more preferably above 100° C.

The previously referenced King patent describes an optical terminator fabricated with use of acrylics, e.g., PMMA which are advantageous in terms of their optical properties but have less than optimal heat distortion temperatures. For example, Acrylite,™ which is a trade name for a PMMA product available from Cyro Industries, has a heat distortion temperature of 90° C. The heat distortion temperature of the acrylics can be raised upon blending with other compounds such as polyimide, polyvinylidene fluoride, and polymethylpentene polymers. A suitable acrylate-polyimide blended material was formerly available from ELF Atochem under the trademark Kamax,™ and a copolymer of propylene and 4-methyl-pentene-1 is commercially available under the trade name TPX™ from Mitsui Plastics. However, blending the materials with compounds to increase the heat distortion properties may unacceptably alter the refractive indices of the materials, and vice-versa. Synthesizing a thermoplastic polymer or co-polymer for use in an optical attenuator or terminator application which optimizes both the optical and mechanical properties presents a difficult challenge.

Accordingly, there remains a need for an optical attenuator or terminator element fabricated with alternative materials and, in particular, with materials meeting the desired criteria of having a refractive index of about 1.45±0.06, enabling reflection of about less than −50 dB, allowing for easy manufacturing, and also resistant to permanent deformation. This invention addresses these needs. Further advantages may appear more fully upon considering the description below.

SUMMARY OF THE INVENTION

Applicants have discovered that an improved optical fiber connector comprises an attenuator element fabricated from an inherently elastomeric material, preferably silicone elastomer. Attenuators fabricated with silicone elastomers may be index matched to the core of an optic fiber (e.g., having a refractive index of about 1.45±0.06), enable reflection of less than −50 dB, allow for easy manufacturing, and are resistant to permanent deformation. In a preferred embodiment, a disc-like attenuator element is punch-cut from a sheet of a silicone elastomer and inserted into the sleeve of an optical connector apparatus adjacent the end portion of an optical fiber. Alternatively, a silicone attenuator element may be fabricated by means of liquid injection molding technology. Applicants have discovered that with this configuration back reflection from the connectors is less than about −50 dB which maintains consistency upon repeated connections and disconnections.

BRIEF DESCRIPTION OF THE DRAWINGS

For a better understanding of the invention, an exemplary embodiment is described below, considered together with the accompanying drawings, in which.

It is to be understood that these drawings are for the purposes of illustrating the concepts of the invention and except for the graphs are not to scale.

DETAILED DESCRIPTION OF THE INVENTION

Applicants have found that thermoplastic creep does not by itself adversely affect the performance of the device, but rather, the creep-related degradation in performance is attributable to a misalignment of the components upon reconnection. That is, if an optical connector is left connected, deformation of the polymer surface may not influence performance of the device. However, if an optical connector is disconnected and then reconnected, it is unlikely the fiber will abut against the attenuator element in precisely the same location upon reconnection as it did in the previous connection. Instead, the reinserted fiber may hang on or hit the lip of the depression, thereby creating an air gap and negatively affecting the attenuation and back reflection properties of the optical transmission path. The optical connectors are, however, intended to be repeatedly disconnected and reconnected, and for this reason, creep is a significant factor affecting performance. The issue of thermoplastic creep is particularly important for attenuator elements intended to be used in outdoor plant equipment where exposure temperatures are potentially high.

Accordingly, applicants have discovered that an advantageous optical fiber connection system for providing attenuation and reducing back reflection comprises an attenuator element fabricated from an inherently elastomeric material. Elastomers may deform under load, but they will recover when the load is removed, and thus, creep does not affect the device performance upon repeated reconnections. Under constrained conditions, elastomers will behave as incompressible fluids, and the dimensions of the elastomeric attenuator element can be precisely defined by giving appropriate attention to the design of the optical coupling. Applicants further have found that silicone elastomers are particularly preferred for fabricating attenuator elements as they may be index-matched to that of optical transmission fibers, are resistant to permanent deformations, exhibit relatively constant mechanical properties over a broad range of temperatures, and are reliable upon exposure to varied environmental conditions. Silicone elastomers are available in a broad range of chemistries, thus enabling the optimization of desired mechanical and optical properties with selective synthesis and formulation.

The attenuator element of this invention can be well illustrated with reference to known optical connectors and thus, a brief discussion of optical connectors is first given. In particular, an ST® connector design is discussed. However, it is to be understood that the ST® connector is discussed only for the purpose of illustration, and the present invention may be included in a number of devices that facilitate attenuation. Also, it is to be understood that the invention is addressed to an attenuator element which may be used in connectors comprising attenuating or terminating systems. An attenuator element is placed within an optical transmission path for attenuating the optical power. An optical terminator is situated at the end of an optical transmission path for absorbing or scattering the incident radiation. The inventive attenuator element may be included within a terminating system but it could also be included within the transmission path of a connector facilitating mechanical interconnection between two fibers. The term "connection system" as used herein comprises attenuating and terminating systems.

Figure 1:
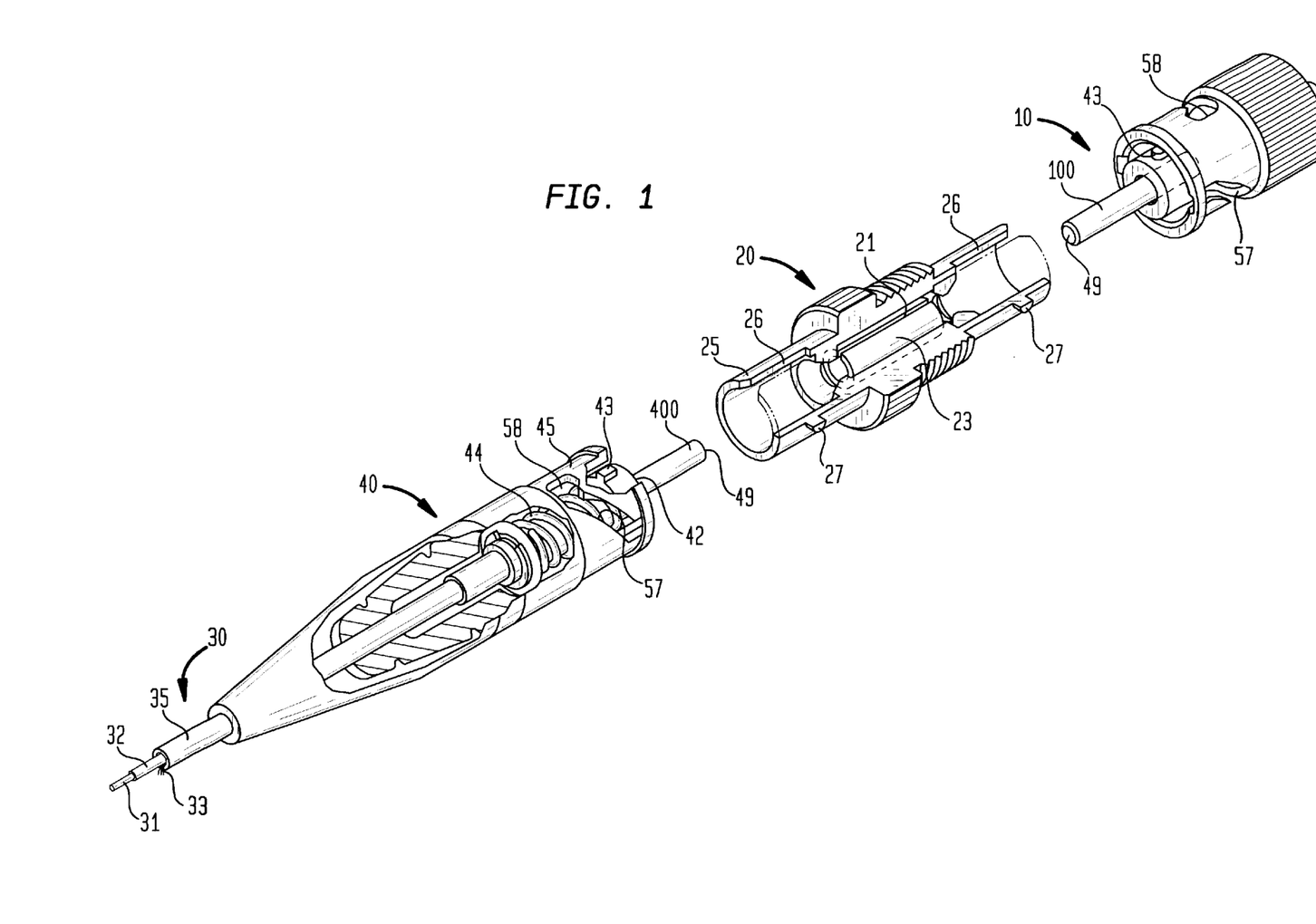
FIG. 1 is an exploded perspective view of an optical fiber connection system.

Referring to FIG. 1, essentially an ST® connector comprises two connector structures 40, 10 and a coupling apparatus 20. The first connector structure 40 has a termination plug or ferrule 400, having a horizontal passageway 41 disposed therein (see FIG. 2) for insertion of the end portion of an optical fiber 31. Before the fiber 31 is inserted into the plug 400, the end portion of the optical fiber cable 30 is prepared by removing its buffer layer 32, strength members 33, and outer jacket 35. The connector structure further comprises a base member 42, a compression spring 44, and a cap 45. The spring 44 biases the base member 42 outwardly from the cable toward the coupling apparatus 20 to hold the connector body within the cap 45. A slot 57 and pin-capturing portion 58 are disposed on the cap 45 for securing the connector structure 40 to the coupling apparatus 20, in cooperation with pins 27, 27 protruding from the outer circumference of the coupling apparatus. A similar structure is provided for the second connector structure 10.

Connection plugs 400, 100 protrude from the connector structures 40, 10, for insertion into an alignment sleeve 23 secured within a housing 25 of the coupling apparatus 20. The housing 25 of the coupling apparatus 20 includes keyways 26, 26 for receiving a key 43 on the connector structure for securing the components together. The sleeve 23 may have a longitudinal slot 21 disposed on it for allowing the sleeve to be compliant with different plug diameters and to accommodate the head portion 72 of an attenuator disc 70 (see FIGS. 2, 2A and 2B). When the two plugs are received in the sleeve 23 and moved together along their longitudinal axes, the end faces 49, 49 of the plugs abut and are pressed together by springs 44, 44 (FIG. 2), making an end-to-end connection between the fibers. Further details regarding the connector need not be repeated herein at length and are set forth in U.S. Pat. Nos. 4,934,785 and 5,619,610, previously cited and incorporated herein by reference.

Figure 2A:
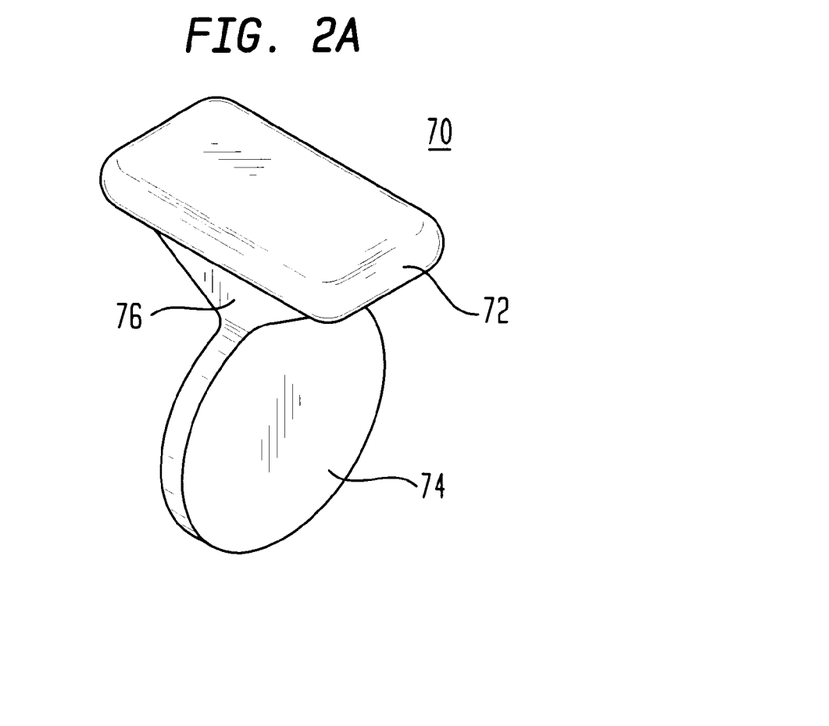
FIGS. 2A and 2B are exploded perspective views of the disc-shaped attenuator element of the embodiment of FIG. 2.
Figure 2B:
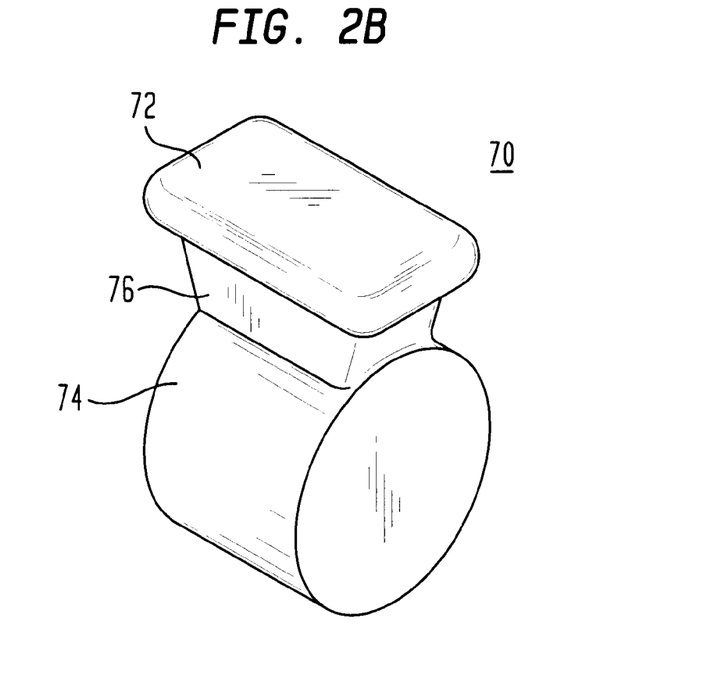

The connector structures 40, 10 or coupling apparatus 20 may comprise attenuator elements fabricated with polymeric materials. For example, FIG. 2 shows a cross-sectional view of the ST® connector in which an attenuator disc 70 is positioned within the alignment sleeve 23. As shown in FIGS. 2A and 2B, the attenuator disc is T-shaped, comprising a disc portion 74 which may be of various widths (FIG. 2B), a head portion 72, and a neck portion 76. The neck portion may be received within the slot 21 of the coupling apparatus's alignment sleeve 23 (FIG. 1). With this configuration, the housing 25 may contain a longitudinal channel 75 for receiving the head portion 72 of the attenuator disc, and the attenuator disc 70 may be moved longitudinally within the sleeve. Further details regarding the attenuator disc are set forth in the Cammons patent, which is cited above and incorporated herein by reference, describing use of PMMA in fabricating the attenuator disc 70.

Figure 3:
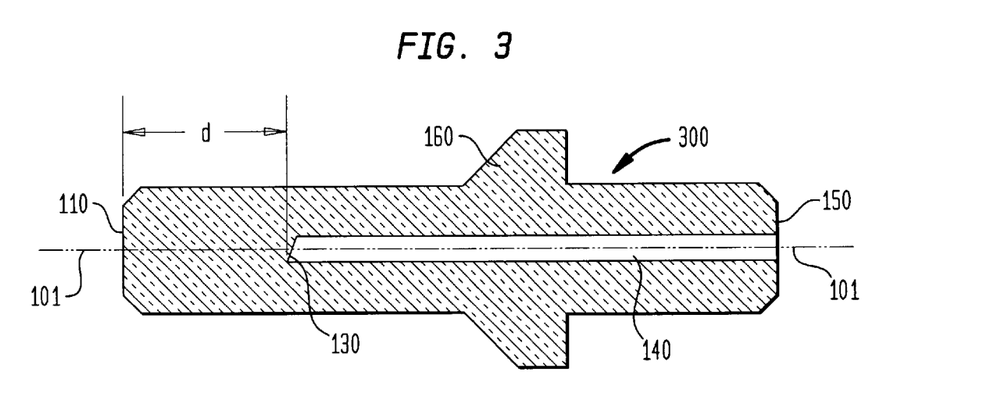
FIG. 3 is a cross-sectional view of an optical fiber terminator.

While the embodiment of FIG. 2 illustrates use of an attenuator disc that may be slidably engaged within the alignment sleeve, a solid attenuation portion may be integrally formed within a plastic optical terminator. For example, FIG. 3 shows an optical terminator comprising a cylindrical structure 300 having a longitudinal axis 101—101 for alignment with the axis of the light transmission path. The cylindrical structure has a proximal end 110 for interfacing with a conventional ferrule or plug (FIGS. 1–2, 400), and a distal end 150. A portion of the structure at the proximal end is solid for a pre-determined distance 'd' before reaching cavity 140, for terminating the signal and minimizing back reflection. In this way, the light enters the terminator at the proximal end surface 110 and is attenuated before it encounters a discontinuity at surface 130. If the distance 'd' is suitably long and the cylindrical structure 300 is fabricated with an appropriately selected material, any light reflected at the point of discontinuity at surface 130 will be severely attenuated before traveling back to the proximal end 110. The structure 300 may have flanges 160 for controlling the depth to which the structure 300 is inserted into a ferrule. Further details regarding an integrally formed plastic optical termination portion are set forth in the King patent, which is cited above and incorporated herein by reference.

In operation, the end face of an attenuator element 70 or optical terminator 300 may be pressed against the end portion of an optical fiber for long periods of time. As previously mentioned, it is desirable that these elements resist permanent deformation so that upon a disconnection and reconnection, there are little or no perturbations on the surface of the attenuator element which could give rise to an air gap or point of discontinuity in the optical fiber transmission path. It has been found that use of an inherently elastomeric material to fabricate the attenuator is advantageous in that, instead of a deformation being irreversibly formed on the surface of the component, such as on the end face of an optical terminator or the disc portion of the attenuator, the elastic properties of the material ensures that a deformation induced by a connection will recover during a disconnection and reform during reconnection. In other words, the materials resist irreversible surface perturbations or deformations.

A preferred elastomer for fabricating the attenuator would exhibit the following properties: (1) a refractive index matched to that of the optical fiber ($n \approx 1.45$ for wavelengths of 1200 nm–1600 nm); (2) a non-tacky surface; (3) sufficient mechanical integrity and stiffness to tolerate deformation without flow and withstand pressures of about 127 to 254 psi; (4) transparency at optical communications wavelengths; and (5) the ability to form films of from 0.005 to 0.070 inches in thickness. It is desirable that the attenuator element be no more than 0.020 inches thick and be able to provide attenuation of from 0 to 20 dB. As reflected below in Table II, a 0.020-inch thick silicone attenuator provides an attenuation of 9.3 dB, which is within these parameters.

It has been found that an advantageous material for the attenuator is a silicone elastomer commercially available from Nusil Silicone Technology of Carpinteria, Calif., identified as CF1-6755. This is a tough, optically clear silicone (having a type durometer hardness of 35), with a refractive index of about 1.46. The operating temperature range is from about −115° C. to +265° C. The product comprises a two-part silicone system, i.e., Part A CF1-6755 available from Nusil is mixed with Part B CF1-6755 in equal parts by weight. An advantageous method of preparing the product is as follows. About 4.4 grams of Part B is transferred into a tall glass vial with a magnetic stirrer. The material is vacuum degassed, and then an equal mass of Part A is added and the mixture is degassed again. Due to the viscosity of the silicone (30,000 to 45,000 cps), the temperature of the sample is raised slightly with a hot air gun to reduce the viscosity of the material to facilitate mixing without initiating a rapid cure reaction. After mixing, the sample is degassed again. About a gram of the mixture is transferred onto a silicon wafer coated with sputtered Ti/Pt/Au, and a second such wafer is placed on top of the silicone product with microscope slides as spacers to produce a sandwich-like geometry. This sample is allowed to cure slowly at room temperature for three days and then heated to 150° C. for three hours. After cooling to room temperature, the wafers are removed from the product by solvent-induced delamination by soaking in acetone overnight. The solvent is removed in a laminar flow hood and dried in a forced air oven at 90° C. The remaining product may be cured in a vacuum oven at about 100 to 120° C. for about 18 to 20 hours and used to prepare attenuator parts. Large sheets of silicone having controlled thickness for use in fabricating the attenuators may be obtained from Specialty Manufacturing, Inc., of Saginaw, Mich.

Applicants have discovered that silicone attenuators fabricated with the CF1-6755 silicone elastomer withstand prolonged exposure to high temperatures with little back reflection and exhibit superior performance as compared with thermoplastic attenuators. The performance of thermoplastic attenuator elements fabricated from Acrylite,™ Kamax,™ and TPX™ was compared to that of silicone elastomeric attenuators, and the data and results are reported below in Tables I and II and FIGS. 4, 5 and 6. The optical measurements for gathering this data were made using a Hewlett Packard 8504A Precision Reflectometer and a Hewlett Packard 8152A Optical Average Power Meter-equipped with a Hewlett-Packard 81521B Optical Head. Time Domain Reflectometry (TDR) with an incident power of −23 dB at 1300 nm was used to determine the optical power reflected from the front and back surfaces of the attenuator elements.

Attenuators were fabricated from the thermoplastics and from silicone elastomer with the thickness of the thermoplastic attenuators being 0.020 inches, and the thickness of the silicone attenuators being 0.020 inches (designated "Nusil 20"), 0.040 inches ("Nusil 40"), and 0.060 inches ("Nusil 60"). The attenuators were thermally aged at 85° C., with the thermoplastics aged for 150 hours, and the 0.060-inch silicone elastomers ("Nusil 60"), aged for 1,200 hours. Thermal aging was performed by placing the attenuators in standard optical interconnection systems (interconnected between opposing optical fibers), and heating them in an oven to 85° C. Standard use conditions were thus simulated to assess the ability of these attenuators to resist permanent deformation.

Reflection and attenuation data was measured for the wavelength 1310 nm at 23° C. for use in standard optical interconnection configurations, and the data is reported in the Tables and Figures discussed below. Investigation revealed, however, that reflection of both thermoplastic and silicone attenuator elements at 1550 nm was similar to that at 1310 nm.

Results on the attenuation and reflection before and after aging are reported below in Tables I and II. Table I reports comparative reflection data for the attenuators, with the alphanumeric parentheticals referring to the attenuation of the elements, that is, (d) refers to a 10 dB attenuator and (h) refers to a 20 dB attenuator. Table II reports the attenuation data:

TABLE I

REFLECTION OF ATTENUATORS BEFORE AND AFTER AGING

|  | Unaged | | Aged | | Change | |
| --- | --- | --- | --- | --- | --- | --- |
|  | Mean | Stdev | Mean | Stdev | Mean | Stdev |
| Acrylite(d) | −37.0 | 0.5 | −19.0 | 8.5 | 18.0 | 8.0 |
| Acrylite(h) | −37.4 | 0.5 | −21.5 | 12.5 | 18.90 | 12.0 |
| Kamax(d) | −31.7 | 0.3 | −35.8 | 2.3 | −4.1 | 2.0 |
| Kamax(h) | −32.0 | 0.6 | −33.6 | 0.8 | −1.6 | 0.2 |
| TPX(d) | −54.8 | 0.5 | −50.3 | 6.6 | 4.5 | 6.1 |
| Nusil 20 | −61.1 | 0.5 | na | na | na | na |
| Nusil 40 | −60.9 | 0.6 | na | na | na | na |
| Nusil 60 | −53.0 | 1.9 | −54.2 | 2.1 | −1.2 | 0.2 |

TABLE II

ATTNEUATION BEFORE AND AFTER AGING

|  | Attenuation (dB) | |
| --- | --- | --- |
|  | Unaged | Aged |
| Acrylite(d) | 10.6 | 10.6 |
| Acrylite(h) | 19.0 | 19.9 |
| Kamax(d1) | 10.1 | 10.6 |
| Kamax(h1) | 18.9 | 19.0 |
| TPX(d2) | 11.1 | 10.3 |
| Nusil 20 | 9.3 | – |
| Nusil 40 | 14.3 | – |
| Nusil 60 | 17.0 | 17.0 |

As can be seen from Table I, the silicone elastomeric attenuators enable reflection of less than −50 dB (−61.1 for Nusil 20, −60.9 for Nusil 40, and −53.0 for Nusil 60), and even after aging, reflectance from the 0.060-inch thick silicone attenuator was −54.2 dB, a smaller figure than for any of the aged thermoplastic attenuators. The deviation in reflection upon aging was significantly less for the silicone elastomeric attenuator elements as compared with the thermoplastic attenuators (i.e., there was a −1.2 deviation for the 0.060-inch silicone attenuators as compared with from −1.6 to 18.0 for the thermoplastics). Notably, the thermoplastic attenuators exhibited a substantial change in reflection after thermal aging for 150 hours, whereas the silicone attenuators were aged for 1,200 and exhibited a comparatively small change. Thus, the results demonstrate that silicone elastomeric attenuators exhibit favorable reflectance properties and accommodate prolonged exposure to high temperatures.

Figure 4:
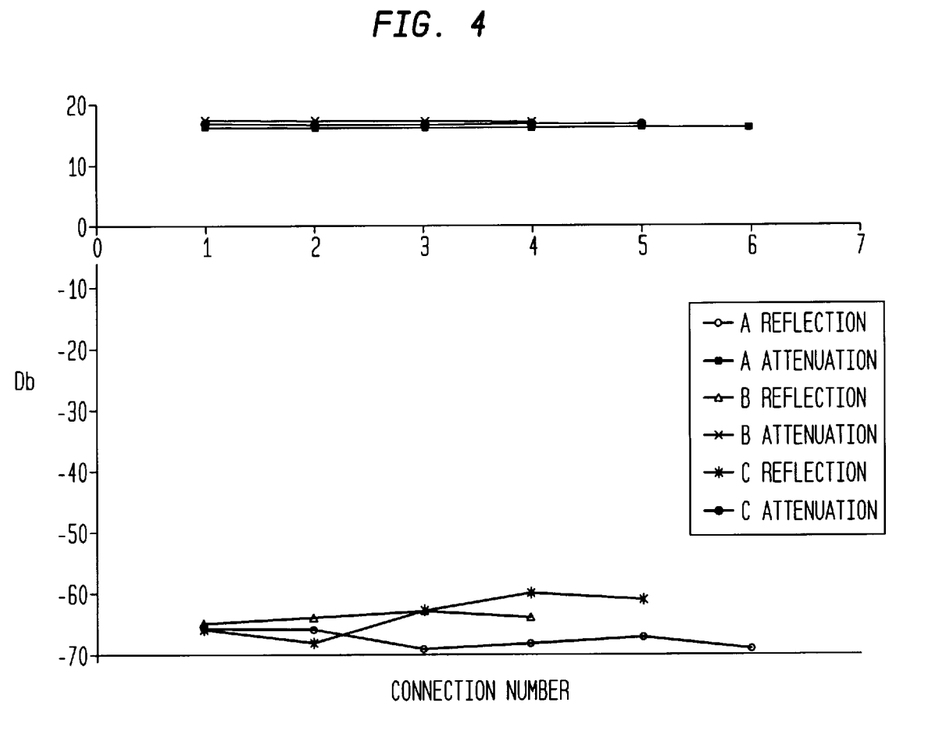
FIG. 4 is a graphical illustration of the attenuation and reflection measured in dB at 1310 nm and 23° C. for three optical attenuator components fabricated with a silicone elastomer.
Figure 5A:
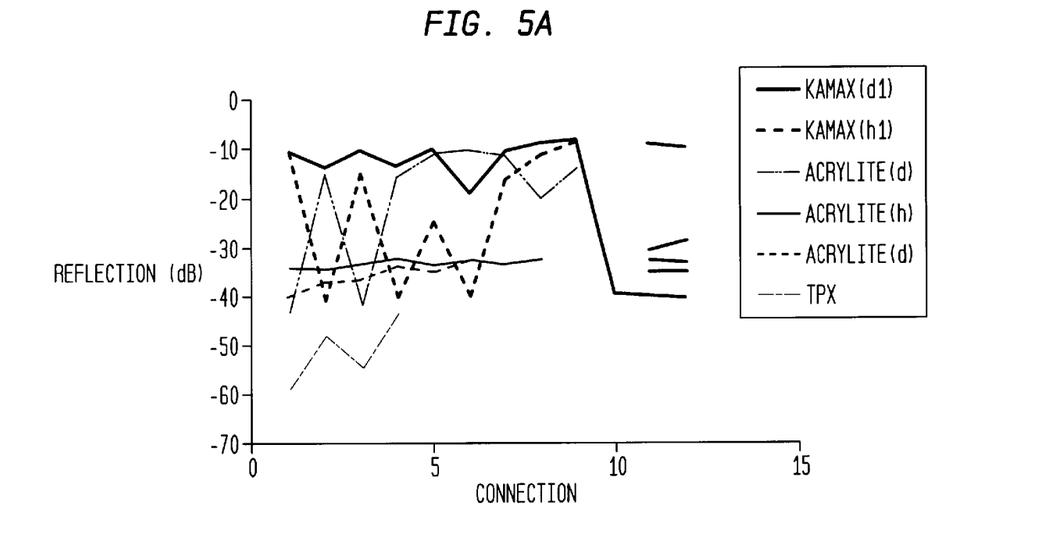
FIG. 5A is a graphical illustration of reflection data upon reconnection for thermally-aged thermoplastic attenuators measured in dB at 1310 nm and 23° C.
Figure 5B:
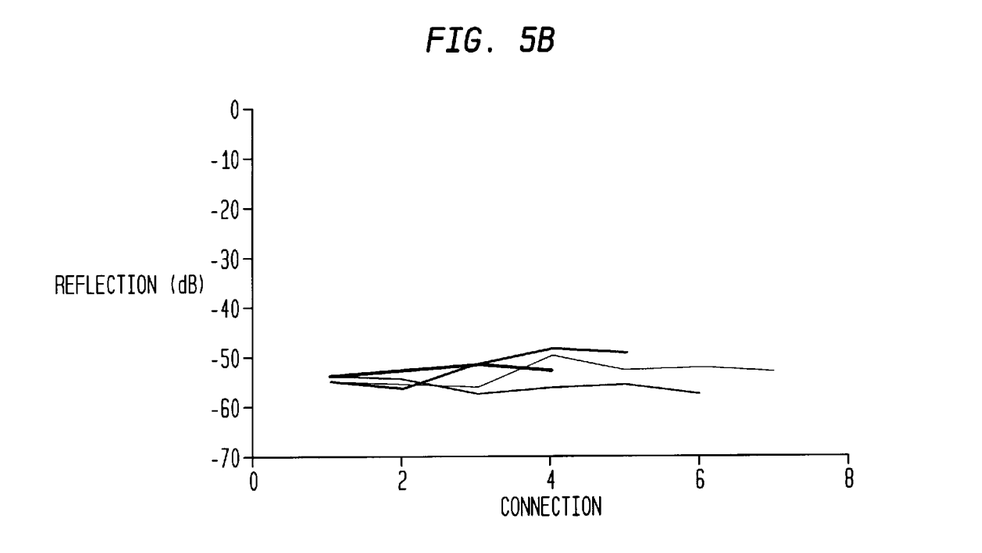
FIG. 5B is a graphical illustration of reflection data upon reconnection for thermally-aged silicone attenuators measured in dB at 1310 nm and 23° C.
Figure 6:
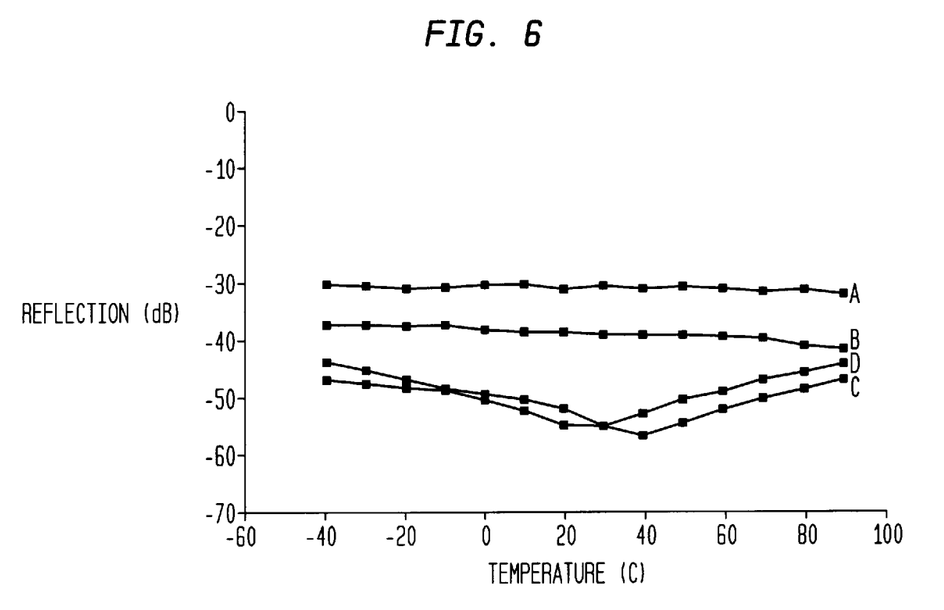
FIG. 6 is a plot of reflection data for thermally-aged thermoplastic and silicone attenuators at various temperatures for illustrating the temperature-dependence of the reflection of the attenuators.

These results were confirmed and found to be consistent during repeated connection and reconnection. FIG. 4 plots the attenuation and reflection measured in dB after repeating mating cycles for three, 0.020-inch thick unaged optical attenuator components fabricated with silicone elastomer. As can be seen, the back reflection of these silicone attenuators consistently fell between −60 dB and −70 dB, with little variation between connections. FIGS. 5A and 5B provide comparative reflection data upon reconnections for thermally aged thermoplastic and silicone attenuators measured at 1310 nm and 23° C. FIG. 5A shows data for the 0.020-inch thick Acrylite,™ Kamax,™ and TPX™ attenuators aged (as described above) for 150 hours at 85° C., and FIG. 5B shows data for 0.060 inch thick silicone elastomer attenuators aged for 1,200 hours at 85° C. (As above, the "d" and "h" parentheticals of FIG. 5A refer to 10 dB and 20 dB attenuators, respectively.) As can be seen from these figures, although the silicone attenuators were aged for a significantly longer time period, they demonstrated consistent performance (FIG. 5B), whereas the variability in reflection associated with the irreversible deformation of the thermoplastic attenuator elements following thermal aging is readily apparent (FIG. 5A).

Additionally, optical microscopy revealed that irreversible deformation from compression does not occur with the silicone elastomeric attenuator elements but does occur with the thermoplastic attenuators. Indentations were observed on the surface of all thermoplastic elements despite thermal aging for only a 150-hour exposure period at high (85° C.) temperature.

Silicone elastomeric attenuators can be fabricated to provide reflection of less than −60 dB through the temperature range of −40° C. to 85° C. which spans the temperature range for the most demanding telecommunications environments. For example, FIG. 6 reports comparative data for the temperature dependent-reflection of thermoplastic and silicone attenuator elements, with plots A, B, and C reflecting data for the Acrylite,™ Kamax,™ and TPX™ attenuators, respectively, and plot D reflecting data for the silicone attenuators. The temperature dependent-reflection of the silicone elements is similar to, albeit slightly higher than, that for the thermoplastics. In any case, the temperature-dependent variation in the reflection of the silicone elements is sufficiently small to render these attenuators usable over the full potential temperature range. Further, studies revealed that the refractive index of the silicone attenuators is essentially insensitive to humidity.

The silicone elastomeric attenuator may be configured in any suitable shape, and the embodiments illustrated in FIGS. 2–3 and discussed above are exemplary. Liquid injection molding (LIM) technology is available for silicone materials which can be used to fabricate the attenuator elements into the desired configuration. See, e.g., G.E. Silicones, Liquid Injection Molding Handbook, Waterford, N.Y. 12188, which is incorporated herein by reference. Also, particles could be incorporated into the silicone matrix to alter the forward scattering angle of incident light and thereby control the attenuation while minimizing reflection. See, e.g., U.S. Pat. No. 5,117,472, issued May 26, 1992 to Blyler, et als., titled Optical Coupler with Mode Mixing Refractive Microparticles, which is incorporated herein by reference.

Figure 7:
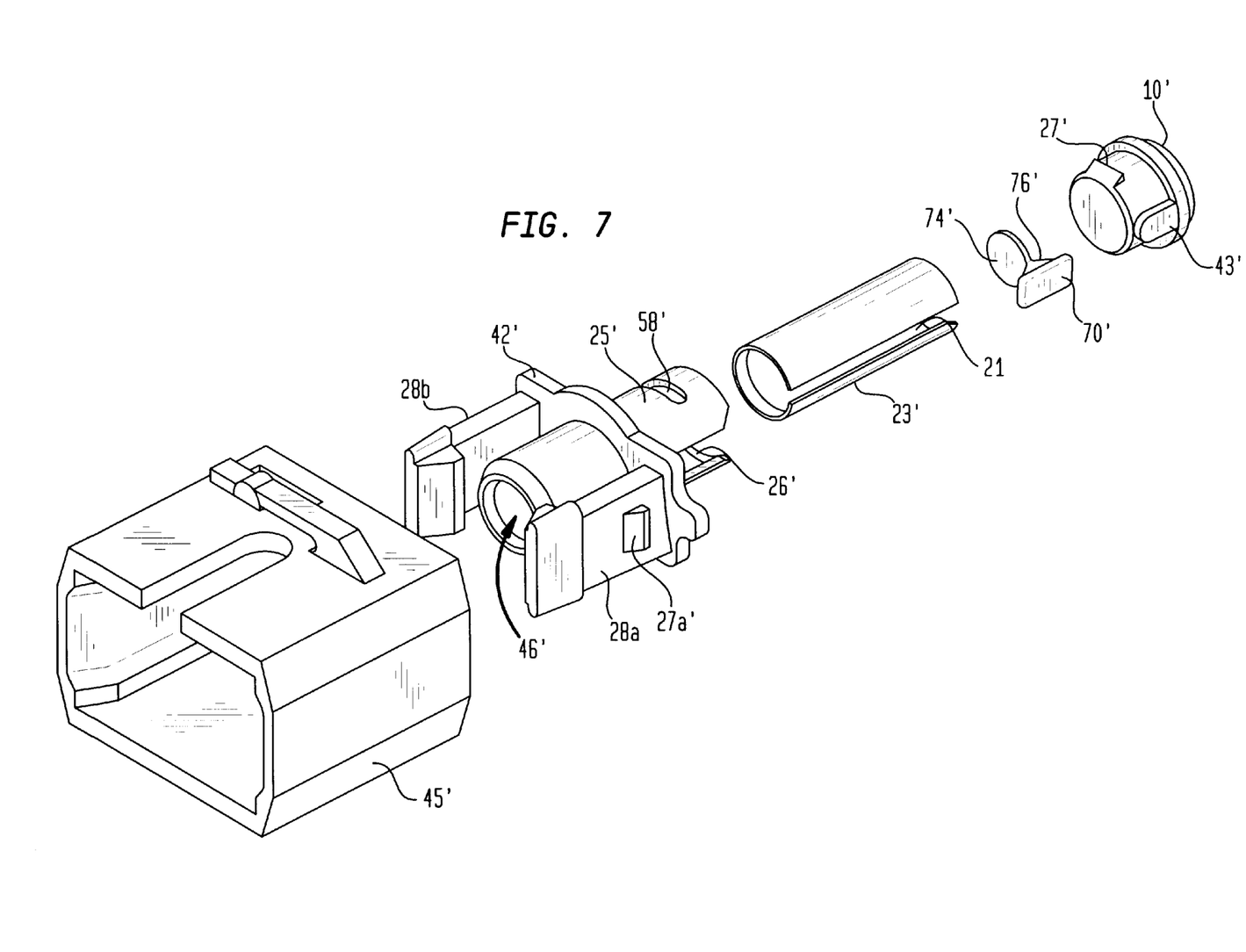
FIG. 7 is an exploded perspective view of an optical fiber connection system incorporating an elastomeric attenuator element.

Advantageously, the fabrication process is simplified by use of disc-like attenuator elements punch cut from sheets of silicone elastomer. The discs are advantageously punched from a cured 1.5 mm sheet of silicone polymer. Referring to FIG. 7, the discs 70' may then be inserted into the sleeve 23' of a standard optical attenuator product by pressing the sleeve 23' over the product. A proposed assembly process may therefore involve the following steps: (1) the silicone attenuator element is placed on a flat surface; (2) the alignment sleeve is brought over the element; (3) the sleeve is lowered over the element and attenuator element is pressed into the sleeve; and (4) the silicone element is pressed into the center of the sleeve with a plunger, e.g., an ST® connector ferrule. The diameter of the disc naturally will be determined by the diameter of the sleeve. Advantageously, the diameter of the disc is slightly less than the diameter of the sleeve so that the disc can fit snugly within the sleeve but is also movable to accommodate and adjust to the motion of impinging fibers. A diameter of 0.100 inches was found to be suitable for standard optical attenuator products. This manufacturing technique may provide a substantial simplification over injection molding approaches.

Figure 8:
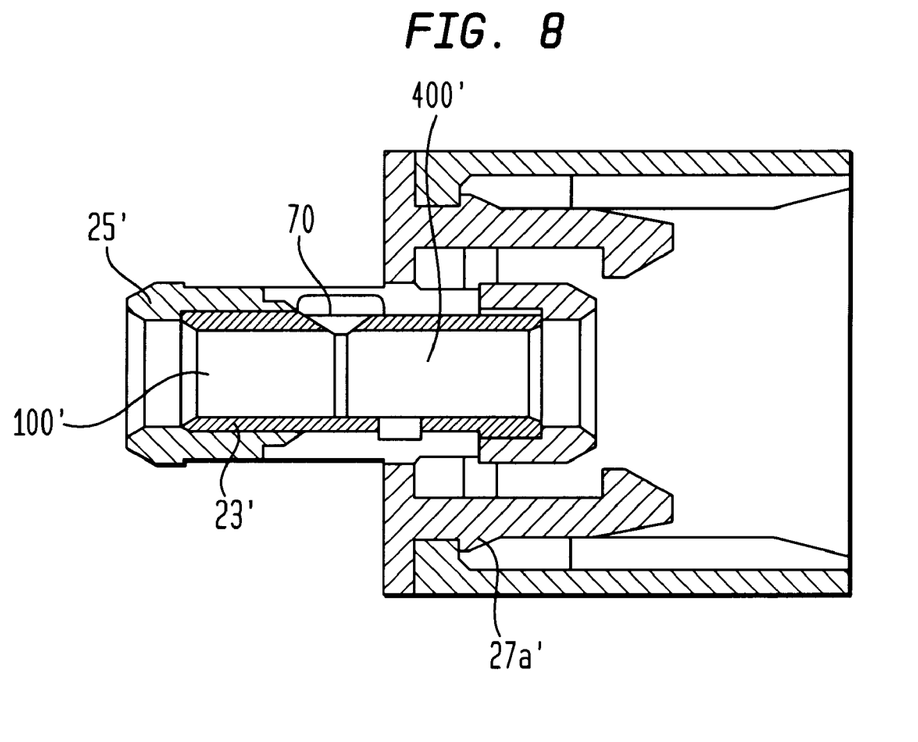
FIG. 8 is a cross-sectional view of the optical connector of FIG. 7.

FIGS. 7 and 8 illustrate an advantageous connection system with which the inventive attenuator element may be used. This system has two halves essentially comprising a retention cap portion (10') and a base portion (45') adapted to be locked together with the end portions of two optical fibers disposed therein to form fiber-to-fiber coupling. The base portion 45' is adapted to receive a housing 25' which, in turn, receives an alignment sleeve 23.' The alignment sleeve 23' has a longitudinal slot 21' disposed therein which is adapted to received the neck 76' of an attenuator disc 70.' Various components are integrally formed on the housing 25' for securing the housing 25' and sleeve 23' to base portion 45' and for securing the termination cap 10' thereon. In particular, the housing comprises a support base 42' having two protruding arms 28a, 28b. Each of the arms 28a, 28b has pin portions (i.e., 27a'), for snap-fitting into an inner bore of the base portion 45' (see FIG. 8). A keyway 26' (FIG. 7), is disposed on the housing for receiving an alignment key 43' on the cap 10.' The housing further comprises a slotted pin-capturing portion 58' for receiving a pin 27' disposed on the outer surface of the retention cap 10.' The housing has an axial passageway 46' in which a connection plug 400' and optical attenuator 100' may be positioned. With this configuration, all parts may be snap-fit together (FIG. 8).

It will be understood that the embodiments described herein are merely exemplary and that a person skilled in the art may make variations and modifications without departing from the spirit and scope of the invention. For example, it will be understood that the refractive index selected for the attenuator will depend upon the optical transmission wavelength, the refractive index of the optical fiber core, and the use temperature for the specific application. All such variations and modifications are intended to be included within the scope of the appended claims.

We claim:

1. An improved low reflectance compression connection system of an optical communications device, the improvement comprising a separable attenuator member fabricated of an elastomeric material resistant to permanent surface deformations for insertion adjacent the end face of an optical fiber of the compression connection system.

2. The improved connection system of claim 1, wherein the elastomeric material comprises a silicone elastomer.

3. The improved connection system of claim 2, wherein the attenuator member is disc-shaped and disposed within a sleeve of the optical connection system.

4. The improved connection system of claim 2, wherein the attenuator member has an index of refraction and a thickness so that it provides a reflectance of about −60 dB to −65 dB.

5. The improved connection system of claim 1, wherein the separable attenuator member has a refractive index of about 1.45±0.06 at optical wavelengths of about 1300 to 1500 nm measured at about 23° C.

6. The improved connection system of claim 1, wherein the refractive index of the material comprising the attenuator member is matched to be substantially the same as the refractive index of the core of the optical fiber so that the member provides a reflectance of less than −50 dB.

7. A plurality of optical fibers for use in a communications device, the fibers being coupled with one or more connection systems according to claim 6.

8. A communications device comprising one or more connection systems according to claim 1 for connecting or terminating an optical transmission path of the communications device.

9. An improved low-reflectance separable optical attenuator member for use in contacting the end-portion of an optical fiber in a compression connection system, the end portion of the fiber being held in a cylindrical ferrule of an optical connector, the optical attenuator member being of the type having a longitudinal axis disposed along the transmission path of the optical fiber, having a solid portion for a predetermined distance 'd' along the longitudinal axis, and having an end face perpendicular to the longitudinal axis, the improvement comprising the end face of the attenuator member being a separable member fabricated with an elastomeric material and configured for removable placement adjacent the end portion of the fiber whereby the attenuator member is resistant to permanent surface deformations when the end face of the fiber is compressed against the attenuator.

10. The improved low-reflectance attenuator of claim 9, wherein the elastomeric material has a refractive index $n=1.45\pm0.06$ at optical wavelengths of about 1300 to 1500 nm measured at about 23° C.

11. The improved low-reflectance separable attenuator member of claim 9, wherein the attenuator member provides a reflectance lower than the power level of the incident optical signal by at least about 50 dB.

12. The improved separable attenuator member of claim 9, wherein the elastomeric material comprises a silicone elastomer.

13. The improved attenuator element of claim 12, wherein the separable attenuator member provides a reflectance of about −60 dB to −65 dB measured at about 1300 nm to 1500 nm and 23° C.

14. An improved optical fiber connecting system having provisions for attenuation with low reflectance to the system, the connecting system being of the type comprising a first plug connecting one optical fiber; a second plug connecting another optical fiber; a sleeve adapted to receive one of the plugs in each end thereof, and an attenuating member comprising a plate-like portion made of a material having an index of refraction substantially equal to the index of refraction of the optical fiber core, the member being engaged between each of the plugs when the plugs are seated in the sleeve, wherein the improvement comprises the attenuator member being a separable member fabricated with an elastomeric material so that the attenuator member is resistant to permanent surface deformations.

15. The improved connecting system of claim 14, wherein the elastomeric material comprises a silicone elastomer.

16. The improved connecting system of claim 15, wherein the attenuator member provides a reflectance of about −60 dB to −65 dB measured at about 1300 nm to 1500 nm and 23° C.

17. A method of attenuating a signal within an optical fiber compression connection system of an optical communications device, the method comprising the steps of (a) providing a separable disc-shaped attenuator member comprising
  (i) providing a sheet of a cured silicone elastomer;
  (ii) punch cutting a disc-shaped member from the sheet of silicone elastomer; and
(b) inserting the disc-shaped member into the sleeve of an optical connection system so that the member is positioned adjacent the end face of an optical fiber of the connection system to provide a reflectance lower than the power level of the incident optical signal by at least about 50 dB.

18. The method of claim 17, wherein the step of inserting the disc-shaped member comprises pressing the sleeve of the optical connection system over the disc-shaped member.

19. The method of claim 18, wherein the sheet of cured silicone elastomer has an approximate thickness of from 0.020 inches to 0.060 inches.

20. An improved low-reflectance termination system for use in terminating an optical signal transmitted along an optical fiber, the termination system being of the type comprising an attenuating member for absorbing or scattering the incident radiation, the improvement comprising the attenuator member being a separable piece for insertion adjacent the end portion of the optical fiber and fabricated of an inherently elastomeric material resistant to permanent surface deformations to provide a reflectance lower than the power level of the incident optical signal by at least about 50 dB.

* * * * *